United States Patent [19]

Burr

[11] 3,841,886
[45] Oct. 15, 1974

[54] REFRACTORY CEMENT INCORPORATING FLUXING COMPONENT

[75] Inventor: Harley W. Burr, Santa Ana, Calif.

[73] Assignee: Motus Chemical, Inc., Las Vegas, Nev.

[22] Filed: Dec. 15, 1972

[21] Appl. No.: 315,712

Related U.S. Application Data

[63] Continuation-in-part of Ser. No. 243,787, April 13, 1972, abandoned.

[52] U.S. Cl. .................................. 106/109, 106/63
[51] Int. Cl. ...................... C04b 11/00, C04b 35/14
[58] Field of Search ...................... 106/109, 110, 63

[56] References Cited
UNITED STATES PATENTS

| | | | |
|---|---|---|---|
| 2,313,085 | 3/1943 | Neiman et al. | 106/63 |
| 2,420,863 | 5/1947 | Charles | 106/63 |
| 3,376,147 | 4/1968 | Dean | 106/110 |
| 3,445,323 | 5/1969 | Schnabel | 106/109 |
| 3,591,393 | 7/1971 | Rankine | 106/63 |
| 3,616,173 | 10/1971 | Green et al. | 106/109 |
| 3,676,164 | 7/1972 | Silby | 106/109 |

*Primary Examiner*—Delbert E. Gantz
*Assistant Examiner*—James W. Hellwege
*Attorney, Agent, or Firm*—Nilsson, Robbins, Bissell, Dalgarn & Berliner

[57] ABSTRACT

Refractory properties are imparted to a cement prepared from non-refractory $CaSO_4$ by incorporation of a primary fluxing component and grog. The composition can be formulated for various uses, e.g., as a structural board, as a castable material for forming a refractory mass and as an oil well casing cement.

7 Claims, 5 Drawing Figures

PATENTED OCT 15 1974 3,841,886
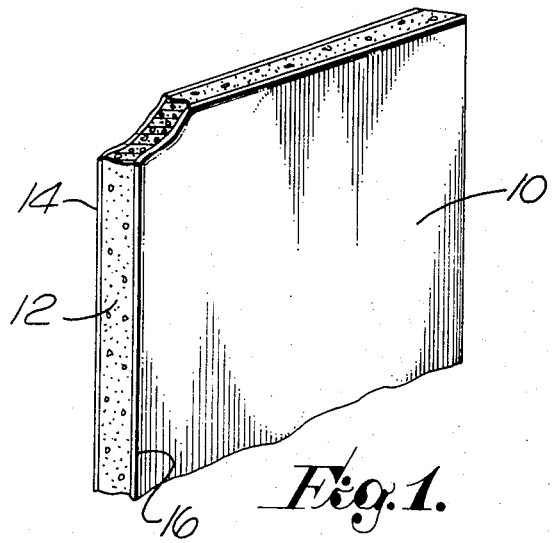
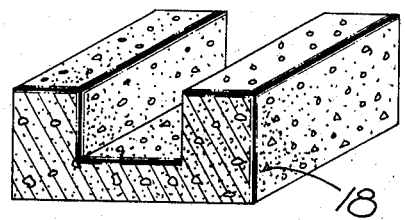
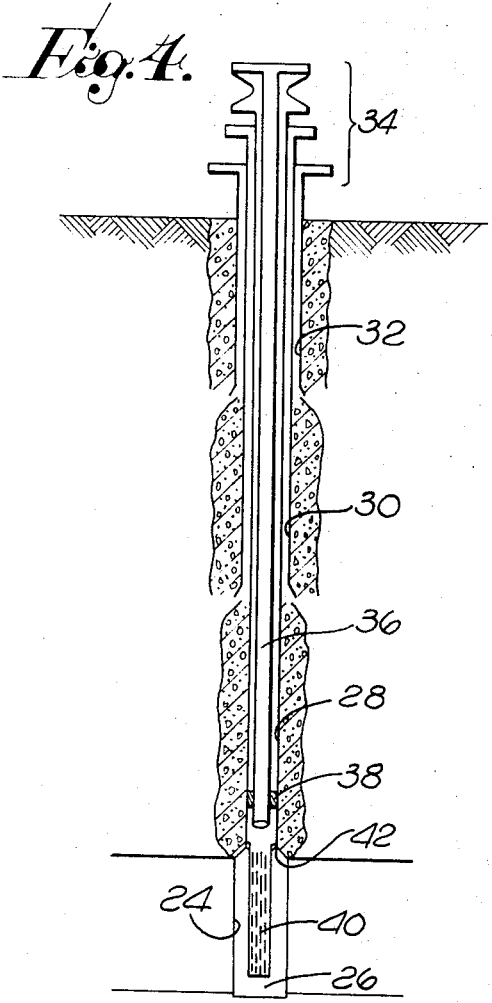
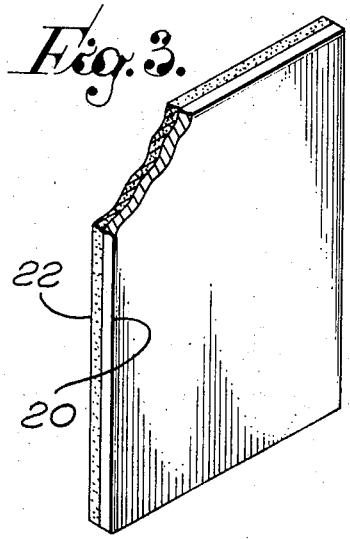
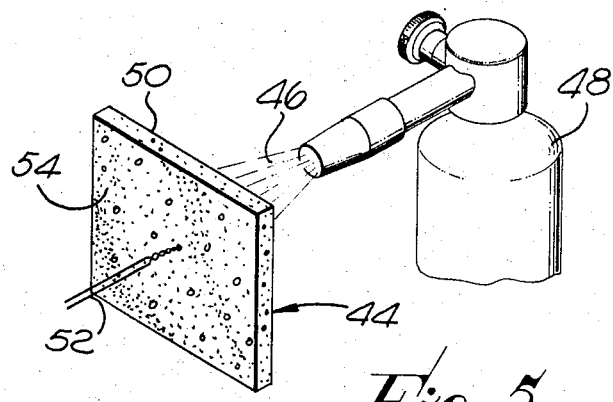

REFRACTORY CEMENT INCORPORATING FLUXING COMPONENT

RELATED APPLICATION

This application is a Continuation-in-Part of application Ser. No. 243,787, filed Apr. 13, 1972, entitled REFRACTORY CEMENT INCORPORATING FLUXING COMPONENT now abandoned.

FIELD OF THE INVENTION

The fields of art to which the invention pertains include the fields of cementitious materials, refractory compositions and oil well cement.

BACKGROUND AND SUMMARY OF THE INVENTION

Calcium sulfate in both its alpha and beta crystalline structure forms and in all its hydrated and anhydride molecular forms is not conventionally used in effective refractory and/or ceramic compositions in environments above 200°C. For example, the official British definition of a refractory material requires a pyrometric cone equivalent of not less than 1,500°C. Other accepted definitions refer to a melting point above Seger cone 26, 1,580°C ("Dictionary of Ceramics" by A. E. Dodd, Littlefield, Adams & Co., 1967, page 227; "Materials Handbook" by G. S. Brady, McGraw-Hill Book Co., 1971, page 658). Thus, by technical definition, calcium sulfate, having a melting point of 1,450°C, is not a refractory. Although in field practice, some materials having a melting point somewhat lower than 1,450°C are used to formulate refractory compositions, and gypsum ($CaSO_4 \cdot 2H_2O$) has been incorporated to a limited extent in some refractory production, it has not been possible to use gypsum or other forms of $CaSO_4$ such as plaster of paris, as a binder in place of clay or refractory cement. The calcination characteristics and structural degradation from heat impingement have precluded the consideration of gypsum and plaster of paris for use in high heat applications.

Thus, it is common knowledge in the gypsum industry that all forms of calcium sulfate shrink and severely crack in a short duration of time when temperatures of 450°C to 850°C are encountered. Surface erosion also rapidly occurs under any degree of flame blast accompanied by high temperatures, thus overcoming what would otherwise be a reasonably low thermal conductivity. For example, gypsum appears to be relatively stable until all water of crystallization is removed (at about 190°C), and other volatile impurities are burned out (by about 850°C), followed by a coalescence of the molecular structure. Gypsum technology relies principally on the property of dehydration under heat which produces an ablative effect for its fire resistance which is therefore a function of time and temperature.

An object of the present invention is to enable the use of calcium sulfate in its various forms as an effective refractory and ceramic material for heat environments above its conventional use limits of about 200°C. In accordance with the present invention by combining calcium sulfate with a certain minimum amount of flux material, a product is formed, which when fired to a stabilizing temperature, exhibits characteristics comparable to ordinary ceramics and refractory materials. By making this unique combination, a construction material is obtained useful in applications previously not possible. In this regard, the flux material in some cases is similar to hardening accelerators used in commercial plastering amounts such as sold under the trademarks "Mack's Cement," "Keene's Cement" and "Parian Cement." However, the present compositions require at least 2 weight percent (based on the calcium sulfate content) of fluxing agent, compared to about one-half percent generally used in the prior plastering cements, at which low level the present fire-resisting properties are not manifested.

Adding a primary flux to gypsum or plaster of paris does not control shrinkage under heat anymore than it does when added to a clay or refractory cement, but it does enable the gypsum or plaster of paris to become very hard and dense and resistant to moisture degradation when fired to a stabilized temperature. Shrinkage control is facilitated by the incorporation of a grog. Depending upon the relative amounts of the component, the novel compositions of the present invention can be used to form insulating fire bricks for furnaces, wall boards, structural members having greater fire resistance than presently obtainable, oil well casing cement, hot tooling and welding fixtures and dies, lightweight floor fill, roof decking, ceiling panels, fire door cores, insulation for safes, pipes, and beams.

BRIEF DESCRIPTION OF THE DRAWINGS

FIG. 1 is a perspective, partially cut-away view of a portion of a structural member, such as a wall board, formed in accordance with the present invention;

FIG. 2 is a perspective view of a ceramic mass formed in accordance with the present invention;

FIG. 3 is a perspective, partially cut-away, view of a portion of sheet metal on which has been sprayed a cementitious composition formulated in accordance with the present invention, for fire insulation purposes;

FIG. 4 is a schematic, cross-sectional view of oil well casing strings secured by cement to the wall of a well bore; and FIG. 5 is a perspective illustration of one manner of testing a wall board of the present construction for fire resistance.

DETAILED DESCRIPTION

In accordance with the present invention, calcium sulfate in any of its various forms is transformed so that its degradation characteristics are controlled by combining it with at least 2 weight percent, based on the calcium sulfate content, of a primary fluxing substance, i.e., a material which lowers the fusion point of the calcium sulfate ("Dictionary of Ceramics," supra, page 118; "Ceramic Industry Magazine," January 1970, page 93). Chemical compounds having a fluxing effect on ceramic materials and which are wholly or partly soluble are not normally used in ceramic production because of adverse results that impair the fire ware. Fluxing substances are rarely used in refractory products because there is little or no need for them at refractory temperatures. However, I have found that soluble types of fluxing compounds are very efficient in a calcium sulfate matrix.

Generally, primary fluxes useful herein include inorganic metal compounds having a fusion point below 1,450°C when fired with calcium sulfate. In this regard, a number of compounds which have melting points substantially above 1,450°C form a eutectic below 1,450°C with calcium sulfate when fired therewith and are therefore suitable as primary fluxes. Specifically, fluxes useful herein are compounds selected from the oxides, hydroxides, and carbonates of a metal from periodic groups IA, IB, IIB, IVA, IVB, VIIB and VIII and any other inorganic compound of a metal from periodic groups IA, IB, IIA, IIB, IVA, IVB, VIIB and VIII provided such compound has a fusion point below 1,450°C when fired with calcium sulfate, a condition readily determinable by simple experiment. Economically feasible examples of such compounds include, where preparable, where the melting point and eutectic are as above, and where a group IIA oxide is not formable below 1,450°C: the bromide, chloride, iodide, fluoride, borate, nitrate, nitrite, metaphosphate, orthophosphate, metasilicate, orthosilicate, sulfate, sulfide, sulfite, chlorate, perchlorate and chlorite of lithium, sodium, postassium, beryllium, magnesium, calcium, strontium, barium, zinc, tin, lead, manganese, iron (including both divalent and trivalent forms), cobalt and nickel; and the oxides, carbonates and hydroxides of lithium, sodium, potassium, zinc, tin, lead, manganese and divalent and trivalent iron.

The calcium sulfate, both alpha and beta crystalline form can be in any of its anhydride or hydrous forms such as anhydrite ($CaSO_4$), plaster of paris (calcium hemi-hydrate, $CaSO_4 \cdot 1/2H_2O$) and gypsum (calcium sulfate dihydrate, $CaSO_4 \cdot 2H_2O$). The particular form of calcium sulfate chosen depends, of course, upon the ultimate utilization of the material, as will be further detailed below.

As above-noted, adding flux to a calcium sulfate matrix does not control shrinkage under heat, but the calcium sulfate becomes very hard and dense and resistant to moisture degradation when fired to a suitable temperature. Shrinkage control is facilitated by adding a grog. A grog is a thermally stabilized, non-plastic material and the word "grog" is a term of art well known to those in the ceramics industry (e.g., see "Refractories" by F. H. Norton, McGraw-Hill Book Co., 1968, pages 182–184).

Examples of grogs are fired clay, silica (quartz or flint), alumina, zirconia, expanded perlite, pumice, silicon carbide and artificial and natural aluminum silicates such as expanded vermiculite, analcite, and andalusite, kyanite, orthoclase, spodumene, microcline, nepheline and syenite. Particularly useful grogs imparting low or no shrinkage and high refractory properties include expanded vermiculite and other forms of aluminum silicate such as a material known as "Franconia" (consisting of Raolinite, cristobalite and quartz — "Mineral and Water Resources of Arizona," by the Arizona Bureau of Mines), and a refractory grog sold under the trade name "Motus Refractory Grog" by Motus Chemical Co., Inc., Las Vegas, Nevada. In some cases certain natural minerals, such as feldspar, have both flux and grog properties and can be used as both. The alkali metal component of such materials apparently selectively "leach" at the operating temperature, leaving a supporting matrix.

The relative amounts of the components, namely calcium sulfate, primary flux and grog are, of course, dependent on the desired physical properties of the finished products. For example, the composition can be used to form an insulating fire brick or as gunite or plastering material for furnace insulation and for fire proofing other metal surfaces, as a structural wall board, as a castable material for forming ceramic products, as an oil well casing cement, and the like. There are also applications in which it would be desirable to utilize a natural flux such as syenite, microcline, orthoclase, andesine or other feldspar, or nepheline, or the like which contains an alkali metal component in significant amount. The reactivity of the alkali metal component as compared to a more conventional chemical compound may be such that a much higher amount of such flux materials should be used. The amount of such flux material can be calculated on the basis of the alkali metal content in accordance with the desired amount of such component. In general, the compositions herein, exclusive of $H_2O$ whether crystalline or added, comprise about 10 to 90 weight percent calcium sulfate and about 90 to about 10 weight percent of flux and grog material, the flux and grog material comprising about 0.2 to about 50 weight percent primary fluxing component and about 99.8 to about 50 weight percent grog component, provided the flux component is at least 2 weight percent based on the calcium sulfate content. The relative amounts depend on the use for the finished product. With plaster boards having, e.g., 65 percent or more calcium sulfate, one would use relatively higher proportions of flux. With castables, or even with wall boards and the like having a low calcium sulfate content (e.g., 10 percent plus a filler such as fly ash) one would use less flux in the total composition.

Referring to FIG. 1, there is illustrated a structural member such as a plaster board 10 formed of a cementitious calcium sulfate matrix 12 sandwiched between paper cover sheets 14 and 16. The cementitious calcium sulfate, for this purpose, is generally formed, exclusive of crystalline or added $H_2O$, of about 60–90 weight percent calcium sulfate and about 40–10 weight percent of flux and grog material, the flux and grog material comprising about 0.2 to about 50 weight percent primary fluxing component and about 99.8 to about 50 weight percent grog component. Conventionally, the wall board is formed of calcium sulfate hemi-hydrate, i.e., gypsum, although the dihydrate or anhydrite can be utilized with a change in the production method of wall board manufacture. With the compositional range stated above, when higher amounts of calcium sulfate are used, e.g., 80 percent, only enough grog is used to provide minimum stabilization, e.g., 15 percent of the total composition, and a relatively high percent of reactive chemical flux, e.g., 5 percent of the total composition, is used to cause a more rapid conversion to occur at ordinary fire temperatures, about 1,000°C. In producing the wall board, sufficient water is added to cause the usual exothermal reaction with the calcium sulfate, generally about 60–80 percent.

Referring to FIG. 2, there is shown a cast product 18, e.g., a fire brick for furnaces, obtained from a compressible composition of calcium sulfate, flux and grog. In this case, a higher operating temperature, e.g., 1,300°–1,400°C may be encountered and substantially more grog is used to form the refractory mass. Generally, exclusive of crystalline or added $H_2O$, the castable composition contains about 10 to about 40 weight percent calcium sulfate and about 90 to about 60 weight percent flux and grog material, the flux and grog material comprising about 0.8 to about 15 weight percent primary fluxing component and about 99.2 to about 85 weight percent grog component provided the flux component is at least 2 weight percent based on the calcium sulfate content. For example, for a cast product, one can use about 25 percent gypsum, about 74 percent grog and about 1 percent flux, an amount of flux to convert the gypsum, the percentages given here being based on the total composition.

If the brick or other molten object is to be cast, the hemi-hydrate form of calcium sulfate, i.e., plaster of paris, can be used. In such case, in view of the greater requirement for $H_2O$, substantially more water should be added in formulating the composition. Generally about 18.5 pounds of water per 100 pounds of the cement is necessary to replace the missing 1.5 mol of $H_2O$. With alpha calcium sulfate, an additional 5–20 percent of water should be added for proper surface wetting. As is generally known, if beta calcium sulfate hemi-hydrate is to be used as ordinary casting plaster, e.g., setting in about 20–30 minutes, then about 40–60 weight percent of additional water should be used. If the beta hemi-hydrate calcium sulfate is to be used for pottery making, generally a higher amount of water, about 55–75 weight percent should be used.

The foregoing amounts of water are with respect to the weight of calcium sulfate. The present invention comprehends the omission of grog for a particular application. When grog is used, additional water may be required to accommodate the added grog, also as well known to the art, and the amount used depends on the absorptivity of the grog. Highly absorptive grogs such as vermiculite, perlite and pumice may require very large amounts of water, e.g., 150 weight percent of the total composition, or higher, whereas lower absorptive grogs such as quartz, and the Motus Franconia grogs referred to above, may require only 25 percent water or less. The components are mixed and then cast or molded and either allowed to set or are pressed, e.g., with 1,000–3,000 lbs/in², to produce a ceramic, which may be heated to a temperature of about 1,000°C, to obtain the surface property desired, all as generally known to the ceramic art.

Referring to FIG. 3, there is illustrated a panel of metal 20 on which has been sprayed, or otherwise applied, a coating 22 of refractory material. One can utilize any of the castable, or the like, compositions referred to above.

Referring to FIG. 4, a schematic oil well is shown in section having a well bore 24 extending into an oil reservoir 26. A number of strings of casing 28, 30 and 32 are set into the well bore and terminate exteriorly thereof in a well head assembly 34. Piping 36, for conducting the well effluent to the surface, is provided within the inner casing and supported therein by a production packer 38. A preperforated liner 40 is suspended from the lower-most casing 28 by a liner hanger 42 set therein. After each casing string 28, 30 and 32 is in place, a cementitious composition is pumped down the inside and up the outside to a predetermined height occupying the space between the casing and the walls of the well bore to effect a desired seal. The cementitious composition can have the broad range ratio of components first described above, but is preferably of a castable, or the like, composition to form a casing seal of superior strength and insulation.

The following examples, in which all parts are by weight, will further illustrate the invention.

Example 1

A test sample was made by intimately mixing and pressing together 100 parts of calcium sulfate dihydrate, 5 parts of sodium hydroxide and 15 parts of water into a cylindrical form 1⅓ inch in diameter and 2⅔ inches in length. The cylinder was fired for 3 hours to 1,000°C and then observed for any apparent deformation, densification, improved surface hardness, moisture degradation and weight change. It was found that the sample lost about 9.5 parts in weight and had a "good" structural change in that there was a glassy surface and excellent densification, with no cracking observable, nor was there any moisture degradation and the sample displayed improved surface hardness.

Examples 2–16

The procedure of Example 1 was repeated except that test samples were prepared using the following materials as flux in place of the sodium hydroxide: (2) lithium chloride, (3) sodium chloride, (4) sodium sulfate, (5) sodium hydroxide, (6) sodium metaphosphate, (7) potassium chloride, (8) potassium sulfate, (9) potassium carbonate, (10) potassium hydroxide, (11) potassium tripolyphosphate, (12) calcium chloride, (13) calcium phosphate, (14) strontium chloride, (15) lead oxide, and (16) lead sulfate. In each case, after firing at 1,000°C the structural changes were determined as "good" as defined in Example 1.

Examples 17–23

The procedure of Example 1 was repeated except that the test samples were formed with the following flux in place of the sodium hydroxide: (17) copper carbonate, (18) manganese chloride, (19) manganese sulfate, (20) manganese carbonate, (21) ferrous chloride, (22) ferrous sulfate, and (23) titanium sulfate. In each case, the samples did not exhibit any significant alteration other than weight loss and were therefore refired to 1,150°C and reexamined for structural transformation. In each case, after the refiring, the observed structural change was "good," as defined in Example 1.

Examples 24–28

The procedure of Examples 17–23 was repeated (i.e., the samples were refired at 1,150°C after showing no structural change), but in place of the fluxes therein, the test samples were formed of the following fluxes: (24) zinc sulfate, (25) zinc oxide, (26) barium sulfate, (27) ferric oxide and (28) nickel chloride. In each case, the observed structural change was "fair," signifying that deformation and densification was small, only minor moisture degradation was observed and the sample had somewhat improved surface hardness.

Examples 29 and 30

The procedure of Example 1 was followed except, for comparison purposes, in place of the sodium hydroxide, a test sample was formed using calcium carbonate and another test sample was formed using calcium oxide as the flux. In both cases, upon firing at 1,000°C, the test samples disintegrated.

The following Table I sets forth a comparison of the properties of the materials tested in accordance with Examples 1–30.

TABLE I

| Example | Flux | Structural Change at 1000°C | at 1150°C | Weight Loss, Parts |
|---|---|---|---|---|
| 1 | NaOh | good | — | 9.5 |
| 2 | LiCl | good | — | 5.5 |
| 3 | NaCl | good | — | 9.3 |
| 4 | $Na_2SO_4$ | good | — | 7.4 |
| 5 | $Na_2CO_3$ | good | — | 7.6 |
| 6 | $NaPO_3$ | good | — | 16.3 |
| 7 | KCL | good | — | 13.8 |
| 8 | $K_2SO_4$ | good | — | 14.0 |
| 9 | $K_2CO_3$ | good | — | 12.6 |
| 10 | KOH | good | — | 13.9 |
| 11 | $K_5P_3O_{10}$ | good | — | 16.6 |
| 12 | $CaCl_2$ | good | — | 7.3 |
| 13 | $CaH_4(PO_4)_2$ | good | — | 14.2 |
| 14 | $SrCl_2$ | good | — | 6.9 |
| 15 | $Pb_3O_4$ | good | — | 9.5 |
| 16 | $PbSO_4$ | — | good | 6.2 |
| 17 | $Cu_2(OH)_2CO_3$ | — | good | 11.5 |
| 18 | $MnCl_2$ | — | good | 11.3 |
| 19 | $MnSO_4$ | — | good | 19.7 |
| 20 | $MnCO_3$ | — | good | 10.8 |
| 21 | $FeCl_2$ | — | good | 7.2 |
| 22 | $FeSO_4$ | — | good | 12.0 |
| 23 | $Ti(SO_4)_2$ | — | good | 4.1 |
| 24 | $Zn(SO_4)$ | — | fair | 12.8 |
| 25 | ZnO | — | fair | 10.3 |
| 26 | $BaSO_4$ | — | fair | 10.2 |
| 27 | $Fe_2O_3$ | — | fair | 10.6 |
| 28 | $NiCl_2$ | — | fair | 7.5 |
| 29 | $CaCO_3$ | disintegrated | — | — |
| 30 | CaO | disintegrated | — | — |

Examples 31–37

Fire resistance tests were conducted to illustrate the improvement in fire resistance imparted by formulations of this invention. Referring to FIG. 5, test panels 44 were prepared each 6 inches square and three-fourths inch thick. Each test panel was mounted vertically in a test stand and the flame 46 from a propane torch 48, having an average flame temperature of 1,050°C at point of contact, was applied against the front face 50 of the panel. A thermocouple 52 was placed against the backside 54 of the panel directly opposite the point of flame impingement. Temperatures were recorded at 5 minute intervals for the first hour, 15 minute intervals for the second hour and 30 minute intervals thereafter for 4 hours or until a temperature of 270°C was reached, whichever occurred sooner. The following materials were used in the respective examples:

Example 31 – 100 parts calcium sulfate hemi-hydrate, 50 parts water

Example 32 – 100 parts calcium sulfate hemi-hydrate, 4 parts sodium hexametaphopshate, 50 parts water Example 33 – 65 parts calcium sulfate hemi-hydrate, 35 parts flint powder (200 mesh), 4 parts sodium hexametaphosphate, 50 parts water Example 34 – 85 parts calcium sulfate hemi-hydrate, 15 parts "Motus Refractory Grog" (80 mesh), 4.5 parts sodium hexametaphosphate, 50 parts water Example 35 – 70 parts calcium sulfate hemi-hydrate, 30 parts "Motus Refractory Grog" (80 mesh), 4 parts sodium hexametaphosphate, 50 parts water Example 36 – 65 parts calcium sulfate hemi-hydrate, 35 parts "Motus Refractory Grog" (80 mesh), 4 parts sodium hexametaphosphate, 50 parts water Example 37 – 75 parts calcium sulfate dihydrate, 25 parts "Motus Refractory Grog" (65 mesh), 2 parts sodium hexametaphosphate, 15 parts water The following table lists the temperatures recorded at the stated time intervals, and demonstrates the refractory advantage of compositions of this invention (Examples 32–37) as compared to plaster of paris (Example 31).

TABLE II

| Time | Example 31 | 32 | 33 | 34 | 35 | 36 | 37 |
|---|---|---|---|---|---|---|---|
| Start | 25°C | 21°C | 21°C | 22°C | 23°C | 25°C | 23°C |
| 5 min. | 64 | 43 | 55 | 59 | 58 | 61 | 41 |
| 10 min. | 64 | 53 | 58 | 62 | 61 | 61 | 56 |
| 15 min. | 81 | 58 | 78 | 62 | 63 | 64 | 58 |
| 20 min. | 126 | 93 | 108 | 99 | 86 | 98 | 61 |
| 25 min. | 144 | 111 | 118 | 116 | 103 | 108 | 78 |
| 30 min. | 151 | 123 | 118 | 128 | 111 | 118 | 98 |
| 35 min. | 164 | 128 | 118 | 130 | 113 | 118 | 111 |
| 40 min. | 181 | 131 | 124 | 135 | 114 | 118 | 111 |
| 45 min. | 191 | 131 | 127 | 136 | 114 | 121 | 113 |
| 50 min. | 198 | 133 | 127 | 136 | 114 | 118 | 116 |
| 55 min. | 201 | 136 | 126 | 136 | 114 | 118 | 114 |
| 1.0 hour | 206 | 138 | 124 | 136 | 114 | 118 | 113 |
| 1.25 hour | 213 | 138 | 126 | 137 | 114 | 118 | 114 |
| 1.5 hour | 271 | 151 | 131 | 138 | 114 | 116 | 114 |
| 2.0 hours | — | 152 | 131 | 139 | 114 | 118 | 118 |
| 3.0 hours | — | 152 | 132 | 137 | 113 | 118 | 116 |
| 4.0 hours | — | 151 | 131 | 139 | 108 | 118 | 116 |

Referring to the test results, it can be seen that the untreated calcium sulfate hemi-hydrate reached a temperature of 151°C after only 30 minutes whereas the poorest of the other samples required 1.5 hours to reach the same temperature. Moreover, and importantly, the test panel of Example 31 rapidly increased in temperature showing a marked deterioration in the last 15 minutes whereas each of the other test samples stabilized at the temperature shown after a similar period of time or much sooner.

I claim:

1. A structural member, comprising, exclusive of $H_2O$, about 60–90 weight percent calcium sulfate and about 40–10 weight percent flux and grog material, said calcium sulfate containing water of hydration, said flux and grog material comprising about 0.2 to about 50 weight percent primary fluxing component and about 99.8 to about 50 weight percent grog component, and an amount of $H_2O$ sufficient to form said structural board, said fluxing component being present in sufficient amount to provide at least 2 weight percent based on the content of said calcium sulfate in said composition.

2. The composition of claim 1 wherein said flux and grog material comprises substantially separately mixed primary flux and grog.

3. The composition of claim 1 wherein said flux and grog material comprise substantially a natural mineral having both flux and grog properties.

4. The composition of claim 1 wherein said flux is a metal compound having a fusion point below 1,450°C when fired with calcium sulfate.

5. The composition of claim 1 in which said flux is a compound selected from the oxides and carbonates of a metal from periodic groups IA, IB, IIB, IVA, IVB, VIIB and VIII, and any other inorganic compound of a metal from periodic groups IA, IB, IIA, IIB, IVA, IVB, VIIB and VIII, wherein said compound has a fusion point below 1,450°C when fired with calcium sulfate.

6. The composition of claim 1 in which said flux is a compound of an alkali metal.

7. The composition of claim 1 in which said flux is an alkali metal oxide.

* * * * *